United States Patent
Jin et al.

(10) Patent No.: US 8,698,477 B2
(45) Date of Patent: Apr. 15, 2014

(54) CONTROL METHOD FOR REDUCING THE AUDIO NOISE

(75) Inventors: Hong-Yuan Jin, Taoyuan Hsien (TW); Jia-Le Dai, Taoyuan Hsien (TW); Hong-Jian Gan, Taoyuan Hsien (TW); Jian-Ping Ying, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 14 days.

(21) Appl. No.: 13/612,520

(22) Filed: Sep. 12, 2012

(65) Prior Publication Data

US 2013/0320950 A1 Dec. 5, 2013

(30) Foreign Application Priority Data

Jun. 4, 2012 (CN) .......................... 2012 1 0196396

(51) Int. Cl.
*G05F 3/02* (2006.01)

(52) U.S. Cl.
USPC .......................................................... 323/304

(58) Field of Classification Search
USPC ................. 323/271, 282, 283, 285, 304, 311; 363/21.02; 381/94.1, 94.2, 94.3
See application file for complete search history.

(56) References Cited

U.S. PATENT DOCUMENTS

| | | | |
|---|---|---|---|
| 6,900,622 B2 * | 5/2005 | Balakrishnan et al. | 323/277 |
| 7,106,000 B2 * | 9/2006 | Han et al. | 313/506 |
| 7,211,991 B2 * | 5/2007 | Balakrishnan et al. | 323/277 |
| 7,701,186 B2 * | 4/2010 | Balakrishnan et al. | 323/277 |
| 7,733,673 B2 | 6/2010 | Balakrishnan et al. | |
| 7,865,217 B2 * | 1/2011 | Lo et al. | 455/570 |
| 7,912,231 B2 * | 3/2011 | Yang et al. | 381/94.2 |
| 8,005,239 B2 * | 8/2011 | Samadani | 381/94.3 |
| 8,115,712 B2 * | 2/2012 | Cheng et al. | 345/87 |
| 8,410,768 B2 * | 4/2013 | Huber et al. | 323/284 |
| 2004/0046533 A1 * | 3/2004 | Balakrishnan et al. | 323/277 |
| 2006/0181253 A1 * | 8/2006 | Balakrishnan et al. | 323/277 |
| 2007/0285068 A1 * | 12/2007 | Balakrishnan et al. | 323/277 |
| 2009/0195229 A1 * | 8/2009 | Balakrishnan et al. | 323/277 |
| 2010/0157631 A1 * | 6/2010 | Lim et al. | 363/41 |
| 2011/0175584 A1 * | 7/2011 | Huber et al. | 323/282 |

OTHER PUBLICATIONS

Geng et al., Soft Start-Up Technique for Large Power Shunt Active Power Filter, Telecom Power Technologies, Jan. 25, 2006, vol. 23, No. 1, pp. 12-15.

* cited by examiner

*Primary Examiner* — Adolf Berhane
(74) *Attorney, Agent, or Firm* — CKC & Partners Co., Ltd.

(57) ABSTRACT

A control method for reducing audio noise is disclosed. The method includes the steps of: providing an input power source; providing a power source converter having a component with a mechanical resonant frequency, coupled to the input terminal or the output terminal of the power source converter; providing an output capacitor and a load connected in parallel therebetween; making the power source converter operate in a burst mode; and controlling the electrical energy transferred from the input terminal to the output terminal of the power source converter during an operating period of every burst cycle, so as to reduce the audio noise of the power source converter.

23 Claims, 8 Drawing Sheets

Fig. 9

CONTROL METHOD FOR REDUCING THE AUDIO NOISE

CROSS-REFERENCE TO RELATED APPLICATIONS

This application claims priority to Chinese Application Serial Number 201210196396.2, filed Jun. 4, 2012, which is herein incorporated by reference in its entirety.

BACKGROUND OF THE INVENTION

1. Field of Invention

The present disclosure relates to power electronics technology. More particularly, the present disclosure relates to a control method for reducing audio noises.

2. Description of Related Art

Currently, as a power supply conversion device of an electronic product, a power source converter is widely applied to various fields including military industry, scientific research, industrial control, communication, electric power, LED illumination, instruments and apparatuses. Along with the continuous improvement of the power source converter, the operating efficiency of the power source converter in light load and no-load output situation is increasingly valued.

Generally, in order to improve the efficiency, when the output power of the power source converter is lower than a preset value, the power source converter enters into a Burst-Mode (hereinafter referred to as BM mode). Herein, the BM mode is also referred to as a skip cycle mode or a discontinuous operation (or burst) mode, in which the power source converter stops operating for a period of time ($T_{burst\_off}$) between two continuous operating pulses ($T_{burst\_on}$ period). In the $T_{burst\_on}$ period, electrical energy is transferred from an input side to an output side of the power source converter, and an energy storage component in the power source converter stores the electrical energy. In the $T_{burst\_off}$ period, the electrical energy is not transferred from the input side to the output side of the power source converter, and the energy storage component in the power source converter releases the electrical energy to the output side. However, traditional magnetic components (such as inductors and transformers) of a power source converter in the BM mode are often affected by variable magnetic fields with frequency equal to that of the BM mode, and thus audio noise is caused. Once the frequency is close to the mechanical resonant frequency of the magnetic components, resonance case happens to the magnetic components, and at this time, the audio noise is especially apparent.

Currently, two technical solutions are mainly adopted for disposing of the audio noise of the magnetic components under the BM mode. One technical solution is adopted to change the mechanical structure and the installation manner of the magnetic components, such as bonding, securing, increasing of sound propagation distance and adding of a sound-proof housing, but these manners cannot fundamentally solve the audio noise problem. The other technical solution reduces the amplitude of the variable magnetic fields with frequency equal to that of the BM mode, so as to reduce the audio noise. However, these methods for reducing the amplitude of the magnetic field are often relatively mechanical and are not beneficial to optimize the efficiency of light load or non-load state.

In order to solve the above disadvantages existing in the conventional techniques, the related industries have been endeavored to seek for a solution, but an appropriate manner is not found for such a long time. Therefore, it is one of current important research and development subjects how to design a control method for reducing the audio noise so as to reduce or eliminate the audio noise when the power source converter operates under the light load or non-load state, and this is also an improvement object in urgent need by the related art.

SUMMARY OF THE INVENTION

An aspect of the present disclosure provides a control method for reducing the audio noise. In the control method, an input power source, a power source converter and a load are provided. The input power source includes a first terminal and a second terminal. The power source converter includes a first input terminal, a second input terminal, a first output terminal, a second output terminal, an output capacitor and a component having a mechanical resonant frequency. The first input terminal of the power source converter is connected to the first terminal of the input power source. The second input terminal of the power source converter is connected to the second terminal of the input power source. The first terminal of the output capacitor is connected to the first output terminal of the power source converter, and the second terminal of the output capacitor is connected to the second output terminal of the power source converter. The component having the mechanical resonant frequency is coupled to one of the first input terminal, the second input terminal, the first output terminal and the second output terminal of the power source converter. The load includes a first terminal and a second terminal. The first terminal of the load is connected to the first terminal of the output capacitor, and the second terminal of the load is connected to the second terminal of the output capacitor. The power source converter is set to operate in a discontinuous operation (or burst) mode which has a burst cycle. The burst cycle includes an operating period $T_{burst\_on}$ and an idle period $T_{burst\_off}$, and the operating period $T_{burst\_on}$ of the burst cycle includes at least one single pulse period $T_s$. The electrical energy transferred from the first input terminal and the second input terminal to the first output terminal and the second output terminal of the power source converter in the operating period $T_{burst\_on}$ is controlled, so as to reduce the audio noise of the power source coverer.

BRIEF DESCRIPTION OF THE DRAWINGS

In order to make the following as well as other aspects, features, advantages, and embodiments of the present disclosure more apparent, the accompanying drawings are described as follows.

DETAILED DESCRIPTION OF THE INVENTION

In order to make the description of the present disclosure more detailed and more comprehensive, various embodiments are described below with reference to the accompanying drawings. The same reference numbers are used in the drawings to refer to the same or like elements. However, those of ordinary skills in the art should understand that the embodiments described below are not used for limiting the scope of the present disclosure. Moreover, the accompanying drawings are only illustrative and are not made according to the original size.

For the Detailed Description and the claims of this application, descriptions related to "coupled with" can generally refer to that a component is indirectly connected to another component through other components, or the component is directly connected to another component through no other components.

For the Detailed Description and the claims of this application, except articles are specifically limited in the context, otherwise, "a/an" and "the" refer to one or more.

The phrase "about", "approximately" or "roughly" in the context is used for modifying any micro-variable quantity, but these micro-variations do not change the nature of the quantity. In the embodiments the error of the quantity modified by the phrase "about", "approximately" or "roughly" is in a range of 20%, preferably in a range of 10%, and more preferably in a range of 5%, unless expressly specified otherwise.

Preferred embodiments of the present disclosure are further described in details at all aspects below with reference to the accompanying drawings.

Figure 1:
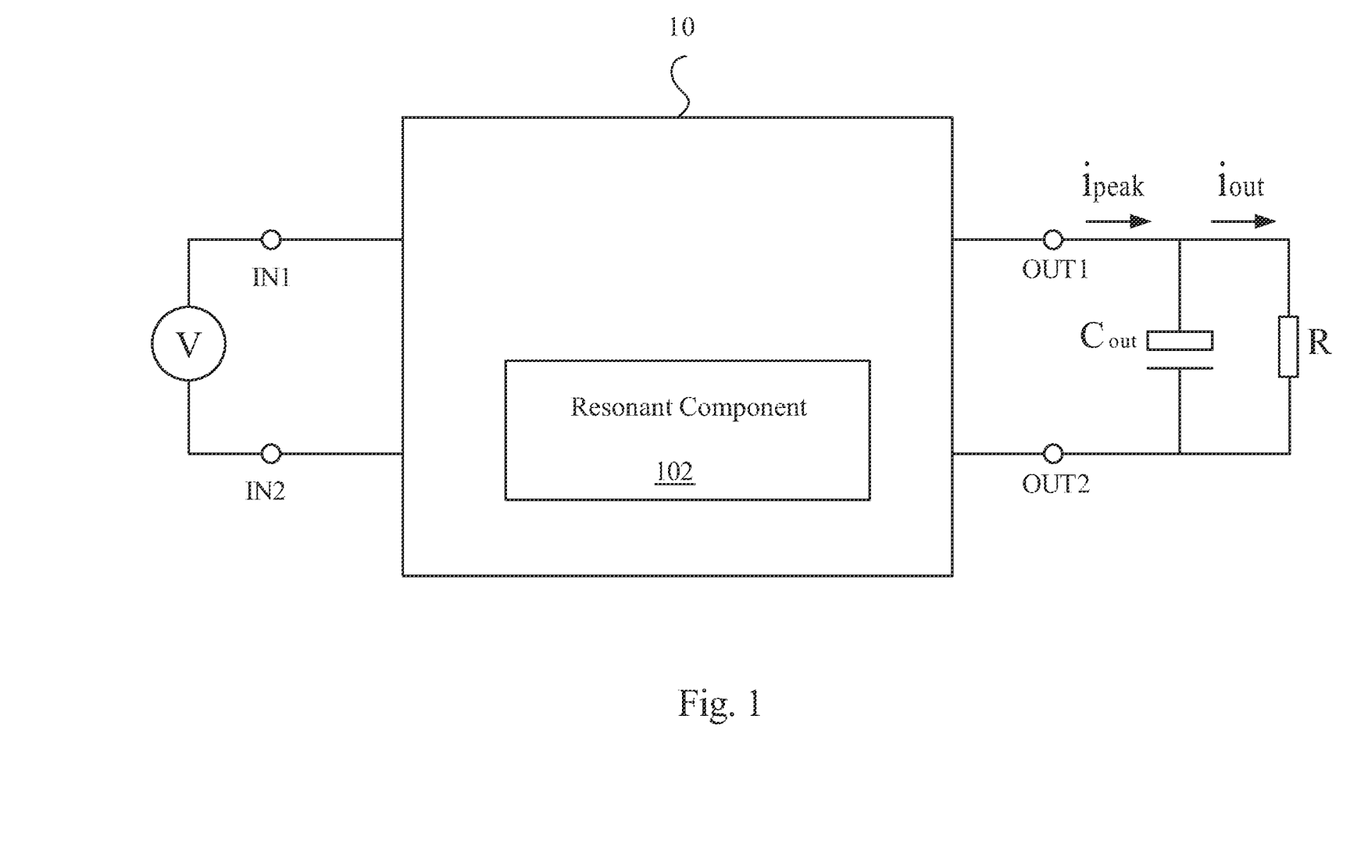
FIG. 1 illustrates a structural block diagram of the power source converter according to an aspect of the present disclo

FIG. 1 illustrates a structural block diagram of the power source converter according to one embodiment of the present disclosure.

Referring to FIG. 1, the power source converter 10 includes a first input terminal IN1, a second input terminal IN2, a first output terminal OUT1 and a second output terminal OUT2. The first input terminal IN1 of the power source converter 10 is connected to a first terminal of an input power source V, and the second input terminal IN2 of the power source converter 10 is connected to a second terminal of the input power source V. The first output terminal OUT1 is connected to one terminal of an output capacitor $C_{out}$, and the second output terminal OUT2 is connected to the other terminal of the output capacitor $C_{out}$. For purpose of convenient description, the output current at the output terminal of the power source converter 10 is indicated as $i_{peak}$, and the current flowing through the load R (hereinafter referred to as load current) is indicated as $i_{out}$.

The power source converter 10 further includes a component 102 with a mechanical resonant frequency. The component 102 is coupled to one of the first input terminal IN1, the second input terminal IN2, the first output terminal OUT1 and the second output terminal OUT2 of the power source converter 10. For example, in some embodiments, the component 102 is coupled to the first input terminal IN1 or the second input terminal IN2 of the power source converter 10; and in some embodiments, the component 102 is coupled to the first output terminal OUT1 or the second output terminal OUT2 of the power source converter 10. It should be understood that the power source converter 10 can transfer electrical energy from the input power source V into the first and second output terminals OUT1 and OUT2 of the power source converter through the first and second input terminals IN1 and IN2 of the power source converter 10. The component 102 can be a magnetic component such as a transformer, an inductor and the like, and also can be a capacitive component such as a filter capacitor, an electrolytic capacitor and the like.

Under no-load or light load state, the power source converter 10 can be set to operate in a burst mode, so as to save electrical energy. Herein, the term "burst mode" means that the power source converter 10 is in an operating state during a period of time and is in an idle state during another period of time, and time periods respectively corresponding to the operating state and the idle state constitute a complete burst cycle.

Figure 2:
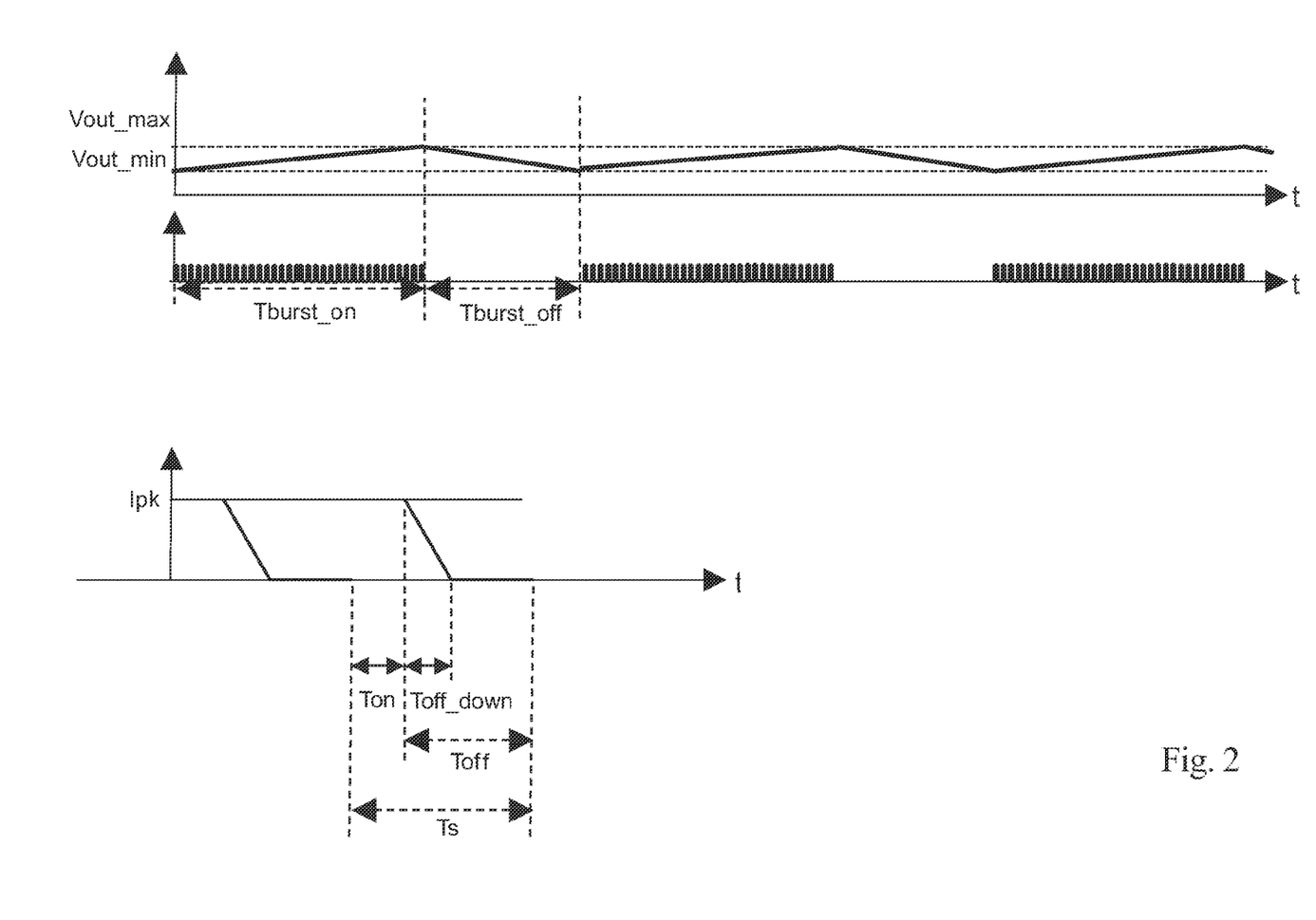
- FIG. 2 illustrates schematic views of a variation curve of the output voltage, a pulse waveform of a burst cycle, and a variation curve of the output current in a burst mode.

FIG. 2 illustrates schematic views of a variation curve of the output voltage, a pulse waveform of a burst cycle formed by an operating period and an idle period, and a variation curve of the output current at the output terminal of the power source converter in a single pulse period when the power source converter of FIG. 1 operates in a burst mode.

Referring to FIG. 2, when the power source converter 10 operates in the burst mode, each burst cycle is formed by an operating period $T_{burst\_on}$ and an idle period $T_{burst\_off}$. That is, an idle period $T_{burst\_off}$ is added between two adjacent operating pulses, or alternatively a continuous operating pulse is provided between two adjacent idle periods $T_{burst\_off}$, so that the power source converter 10 transfers electrical energy from the first and second input terminals IN1 and IN2 to the first and second output terminals OUT1 and OUT2 in the burst cycle.

It can be seen by referring to both the variation curve of the output voltage and the pulse waveform of the burst cycle of FIG. 2 that, when the power source converter is in the operating period $T_{burst\_on}$, electrical energy is transferred from the first and second input terminals IN1 and IN2 to the first and second output terminals OUT1 and OUT2, and the electrical energy is stored by a component such as an inductance component or a capacitance component, and the voltage value of the output voltage is boosted from $V_{out\_min}$ to $V_{out\_max}$. Accordingly, when the power source converter 10 is in the idle period $T_{burst\_off}$, electrical energy is not transferred from the first and second input terminals IN1 and IN2 to the first and second output terminals OUT1 and OUT2, and electrical energy stored previously is released, and thus the voltage value of the output voltage is dropped from $V_{out\_max}$ to $V_{out\_min}$.

In an embodiment, the operating period $T_{burst\_on}$ includes at least one single pulse period $T_s$. After the single pulse period $T_s$ is amplified, it is not hard to see that each single pulse period $T_s$ further includes an interval of the pulse width of the applied pulse and a delay time after the applied pulse. Taking a flyback converter as an example, when the power source converter is in a time interval $T_{on}$ for providing pulse in the single pulse period $T_s$, the output current at the output terminal of the power source converter rises gradually and reaches the peak current value $I_{pk}$. When the pulse is not applied, the output current at the output terminal of the power source converter falls gradually from the peak current value $I_{pk}$, and after a time period $T_{off\_down}$, the output current of the power source converter falls to zero. Next, after a delay time, the end time point of the single pulse period $T_s$ comes finally. In FIG. 2, a transition time for the current to rise to the peak value is indicated as $T_{on}$, a transition time for the current to fall to zero from the peak value and delay is indicated as $T_{off}$, and the single pulse period $T_s$ is equal to the sum of the transition times $T_{on}$ and $T_{off}$.

A maximum value and a minimum value of the output voltage at the output terminal of the power source converter are respectively defined as $V_{out\_max}$ and $V_{out\_min}$, and the output voltage ripple is ($V_{out\_max}-V_{out\_min}$). $I_{pk}$ is the peak value of the output current at the output terminal of the power source converter, and $T_{D\_avg}$ is the average of the peak value of the output current at the output terminal of the power source converter in the single pulse period $T_s$. The operating period, the idle period, the average of the peak current value and the burst frequency of the burst cycle $T_{burst}$ are each calculated through the following formula:

$$T_{burst\_on} = \frac{(V_{out\_max} - V_{out\_min}) \cdot C_{out}}{I_{D\_avg} - I_{out}} \quad (1)$$

$$T_{burst\_off} = \frac{(V_{out\_max} - V_{out\_min}) \cdot C_{out}}{I_{out}} \quad (2)$$

$$T_{burst} = T_{burst\_on} + T_{burst\_off} \quad (3)$$

$$I_{D\_avg} = \frac{\frac{I_{pk}}{2} \cdot T_{off\_down}}{T_s} \quad (4)$$

$$F_{burst} = \frac{1}{T_{burst}} \quad (5)$$

According to the above formulas (1)-(5), an equation of the burst frequency is obtained as follows:

$$F_{burst} = \frac{I_{out} - \frac{I_{out}^2}{I_{D\_avg}}}{(V_{out\_max} - V_{out\_min}) \cdot C_{out}} \quad (6)$$

It can be seen from the above formula (6) that the burst frequency $F_{burst}$ is related to four parameters, i.e., the load current $I_{out}$, the average $I_{D\_avg}$ of the peak value of the output current at the output terminal of the power source converter in the single pulse period $T_s$, the output voltage ripple ($V_{out\_max}-V_{out\_min}$) at the output terminal of the power source converter, and the output capacitance $C_{out}$. It can be seen from formula (2) that the average of the peak value of the output current at the output terminal of the power source converter in the single pulse period $T_s$ and the peak value of the output current at the output terminal of the power source converter have a predetermined relation. Therefore, it can also be understood that the burst frequency $F_{burst}$ is related to the load current $I_{out}$, the peak value $I_{pk}$ of the output current at the output terminal of the power source converter, the output voltage ripple ($V_{out\_max}-V_{out\_min}$) of the output terminal of the power source converter and the output capacitance $C_{out}$.

Figure 3:
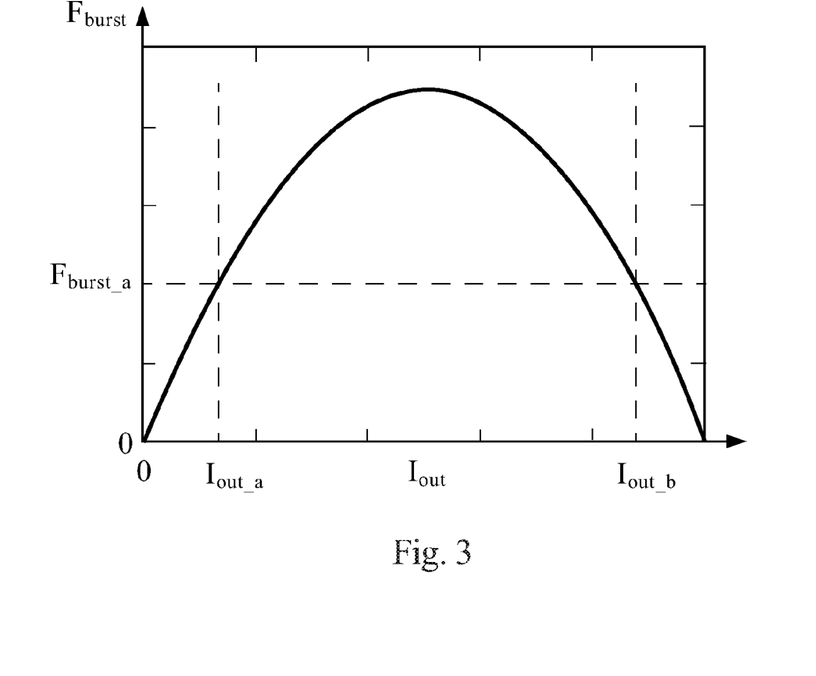
FIG. 3 illustrates a curve diagram of the relation between a burst frequency and a current flowing through a load before the control method of the present disclosure is adopted.

For example, under the condition that other parameters are constant, the smaller the output current $I_{pk}$ is, the less the electrical energy transferred from the first and second input terminals IN1 and IN2 to the first and second output terminals OUT1 and OUT2 is, and thus the lower the burst frequency $F_{burst}$ is. Also for example, under the condition that other parameters are constant, if the load current $I_{out}$ is between $I_{out\_a}$ and $I_{out\_b}$, the burst frequency $F_{burst}$ is greater than a reference frequency $F_{burst\_a}$, and at this time, the amplitude of the audio noise of the power source converter may exceed a preset specification, as shown in FIG. 3.

In one embodiment, the total electrical energy transferred from an input side IN to an output side OUT of the power source converter 10 in a single burst cycle is marked as E, and the electrical energy transferred from the input side IN to the output side OUT in each single burst cycle $T_s$ is marked each as E1, E2, . . . , En, wherein n represents the number of single pulse periods required for transferring the electrical energy E, and the total electrical energy E is the sum of E1, E2, . . . , En. Moreover, since electrical energy is transferred in the operating period $T_{burst\_on}$ of each burst cycle and electrical energy is not transferred in the idle period $T_{burst\_off}$. On the premise that the total electrical energy E transferred in a single burst cycle is unchanged, reducing electrical energy transferred in the single pulse period $T_s$ means that electrical energy can be transferred through more single pulse periods $T_s$ in the corresponding operating period $T_{burst\_on}$. Therefore, it can be seen that the operating period $T_{burst\_on}$ is prolonged, and thus the burst cycle $T_{burst}$ is extended, and the burst frequency $F_{burst}$ is reduced. The effect of reducing audio noise is achieved via the reduction of the burst frequency $F_{burst}$.

In another embodiment, the power source converter 10 can be a forward converter, a flyback converter or a bridge converter. Moreover, the power source converter may also be a boost converter, a buck converter, a buck-boost converter, a resonant converter or such as an LLC converter. It should be understood that no matter which converter of the above types is adopted as the power source converter 10, in the burst mode, as long as the electrical energy transferred from the first input terminal IN1 and the second input terminal IN2 to the first output terminal OUT1 and the second output terminal OUT2 of the power source converter in the operating period $T_{burst\_on}$ under the burst mode is controlled, the burst frequency of the power source converter 10 can be kept away from the mechanical resonant frequency of the component 102, so as to reduce the audio noise of the power source converter 10.

Figure 4:
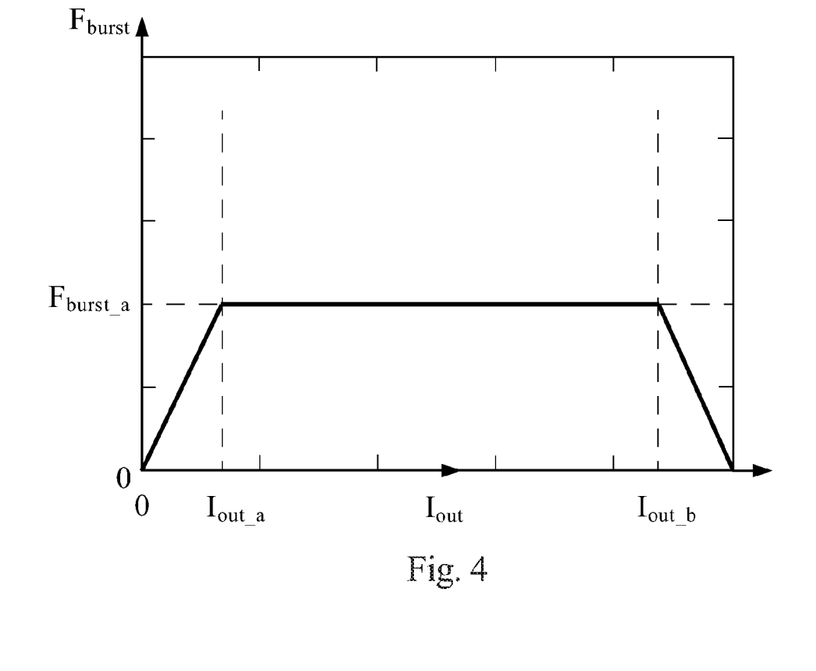
FIG. 4 illustrates a curve diagram of the relation between a burst frequency and a current flowing through a load after the control method of the present disclosure is adopted.
Figure 5:
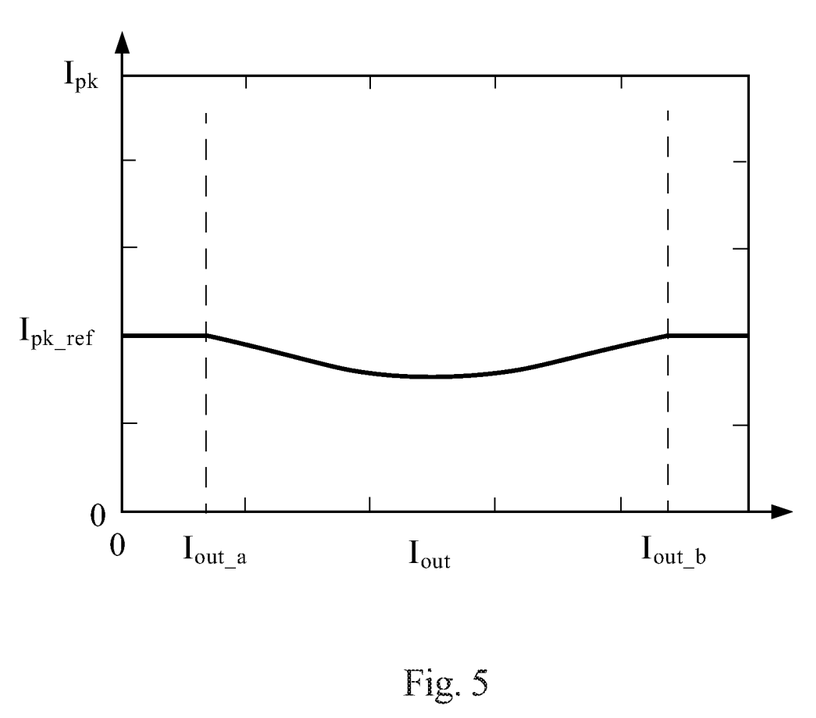
FIG. 5 illustrates a curve diagram of the relation between a peak output current and a load current after the control method of the present disclosure is adopted.

FIG. 4 illustrates a curve diagram of the relationship between a burst frequency and a load current after the control method of the present disclosure is adopted. FIG. 5 illustrates a curve diagram of the relationship between a peak output current at the output terminal of the power source converter and a load current after the control method of the present disclosure is adopted.

Referring to FIG. 3 again, when the load current is smaller than $I_{out\_a}$ or greater than $I_{out\_b}$, the burst frequency of the power source converter 10 under the burst mode is lower than a reference frequency $F_{burst\_a}$. When the load current is between $I_{out\_a}$ and $I_{out\_b}$, the burst frequency of the power source converter 10 under the burst mode will exceed the reference frequency $F_{burst\_a}$. If the reference frequency corresponds to a threshold frequency of the audio noise (that is, the burst frequency lower than the reference frequency causes lower audio noise, and the burst frequency higher than the reference frequency causes louder and more apparent audio noise), the load current $I_{out}$ which is between $I_{out\_a}$ and $I_{out\_b}$ causes the problem of audio noise of the power source converter under the burst mode, otherwise, the load current which is smaller than $I_{out\_a}$ or greater than $I_{out\_b}$ causes lower audio noise of the power source converter 10.

In comparison of FIGS. 4 and 3, as shown in FIG. 4, in the control method of the present disclosure, when the power source converter 10 operates in the burst mode and a load current is smaller than $I_{out\_a}$ or greater than $I_{out\_b}$, since the actual burst frequency is not higher than a reference frequency $F_{burst\_a}$, the control method does not need to regulate parameters closely related to the burst frequency. Only when the load current $I_{out}$ is between $I_{out\_a}$ and $I_{out\_b}$ which causes the burst frequency of the power source converter 10 to be close to the mechanical resonant frequency of the component 102, the control method regulates parameters closely related to the burst frequency.

It should be pointed out that when the power source converter 10 is in burst mode, since electrical energy transferred in a single pulse period is different, the output power (such as the output current at the first and second output terminals OUT1 and OUT2) of the power source converter 10 is different. In an embodiment, this control method includes the step of detecting the output power at the output terminal of the power source converter 10 and regulating electrical energy transferred from the first and second input terminals IN1 and IN2 to the first and second output terminals OUT1 and OUT2 of the power source converter 10 in the single pulse period according to the output power.

It can be seen from the aforementioned description that the control method of the present disclosure is applied to control the electrical energy transferred from the input terminal to the output terminal of the power source converter in the single pulse period, so that the burst frequency of the burst mode meets a certain preset value, and thus the audio noise of the power source converter is reduced. It should be pointed out that since the electrical energy transferred from the input terminal to the output terminal in each single pulse period is different, the corresponding energy transfer efficiency may be also different. When the transferred electrical energy is a certain reference value, the audio noise of the power source converter can be reduced and the energy transfer efficiency can be optimized. As shown in FIG. 5, when the output current $I_{pk}$ at the output terminal of the power source converter is $I_{pk\_ref}$, the energy transfer efficiency is relatively optimal. Along with the reduction of $I_{pk}$, the energy transfer efficiency is reduced gradually. When the output current at the output terminal of the power source converter is reduced to the lower limit threshold value, the energy transfer efficiency is the lowest. Here, $I_{pk\_ref}$ can either be a fixed value or be regulated according to different operating conditions during the operating period, so as to meet the requirement of energy transfer efficiency.

Figure 6:
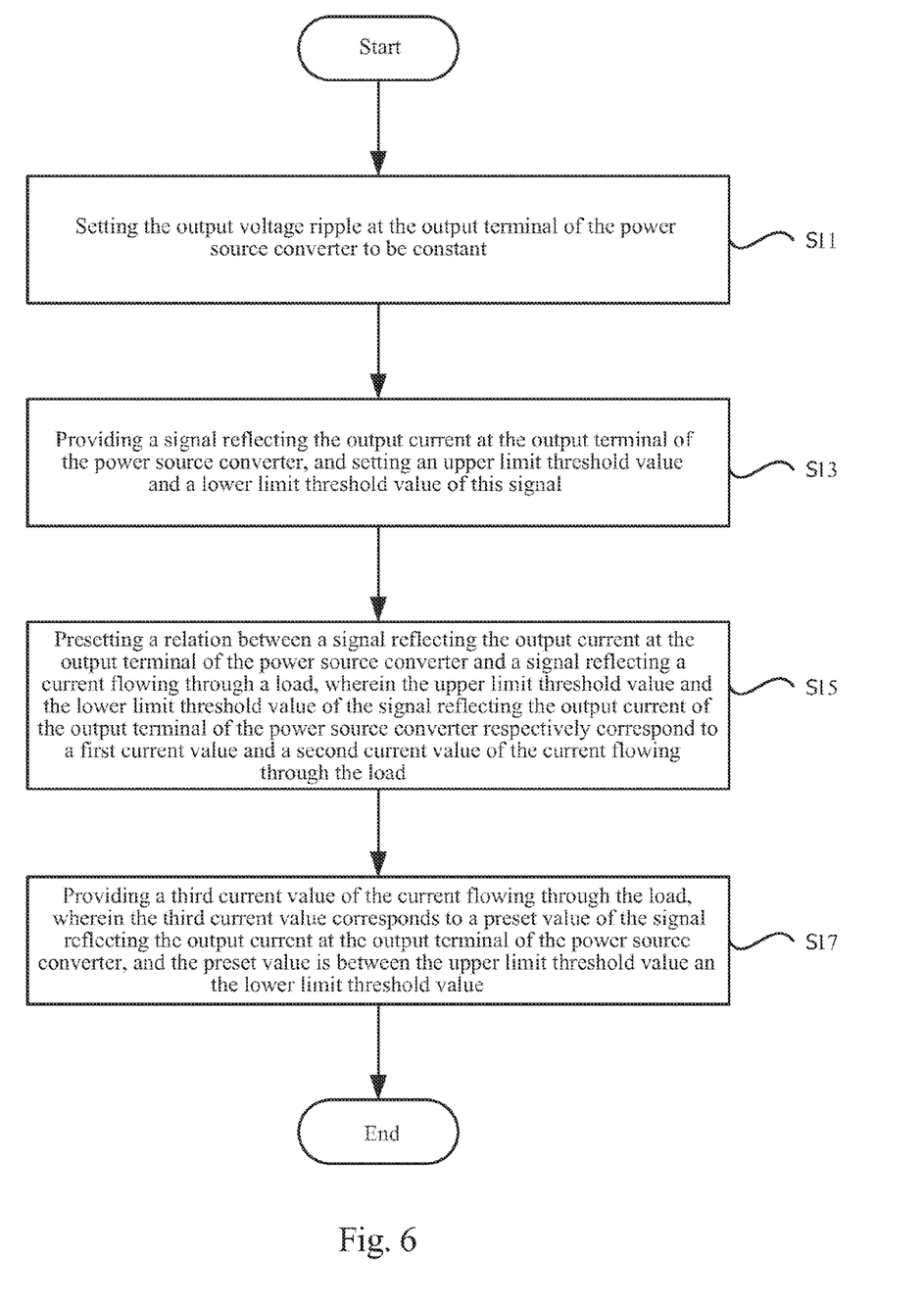
FIG. 6 illustrates a flow block diagram of the control method in first embodiment of the present disclosure.

FIG. 6 illustrates a flow chart of the control method of a first embodiment of the present disclosure. Referring to FIG. 6, in this control method, firstly in step S11, the output voltage ripple at the output terminal of the power source converter is set to be constant; next in step S13, a signal reflecting the output current at the output terminal of the power source converter is provided, and an upper limit threshold value and a lower limit threshold value of this signal are set; and subsequently in step S15, a relation between the signal reflecting the output current at the output terminal of the power source converter and the signal reflecting a load current is preset, and the upper limit threshold value and the lower limit threshold value of the signal reflecting the output current of the output terminal of the power source converter respectively correspond to a first current value and a second current value of the load current; finally in step S17, a third current value of the load current is provided, and the third current value corresponds to a preset value of the signal reflecting the output current at the output terminal of the power source converter, and the preset value ranges between the upper limit threshold value and the lower limit threshold value. In an embodiment, the second current value is greater than the first current value, and the third current value is greater than the second current value.

In an embodiment, the signal reflecting the output current at the output terminal of the power source converter is the average $I_{D\_avg}$ of the peak value of the output current in the single pulse period. It can be seen from the above formula (4), the average of the peak value in the single pulse period and the peak value $I_{pk}$ of the output current at the output terminal of the power source converter have a predetermined relation.

With steps S11 and S13, when the output voltage ripple ($V_{out\_max} - V_{out\_min}$) at the output terminal of the power source converter is constant, according to the corresponding relation between the peak value $I_{pk}$ of the output current at the output terminal of the power source converter and the load current $I_{out}$, a corresponding peak value of the output current can be obtained based on the actual load current, so as to control the output current at the output terminal of the power source converter, to make the burst frequency of the power source converter lower than a reference frequency, and to reduce the audio noise of the power source converter. For example, the reference frequency is not greater than one half of the mechanical resonant frequency of a related component in the power source converter, so that the effect of reducing the audio noise is relatively apparent. Furthermore, when more than one mechanical resonant frequency exists in the power source converter, the mechanical resonant frequency which vibrates most severely under the same excitation is selected.

Figure 7:
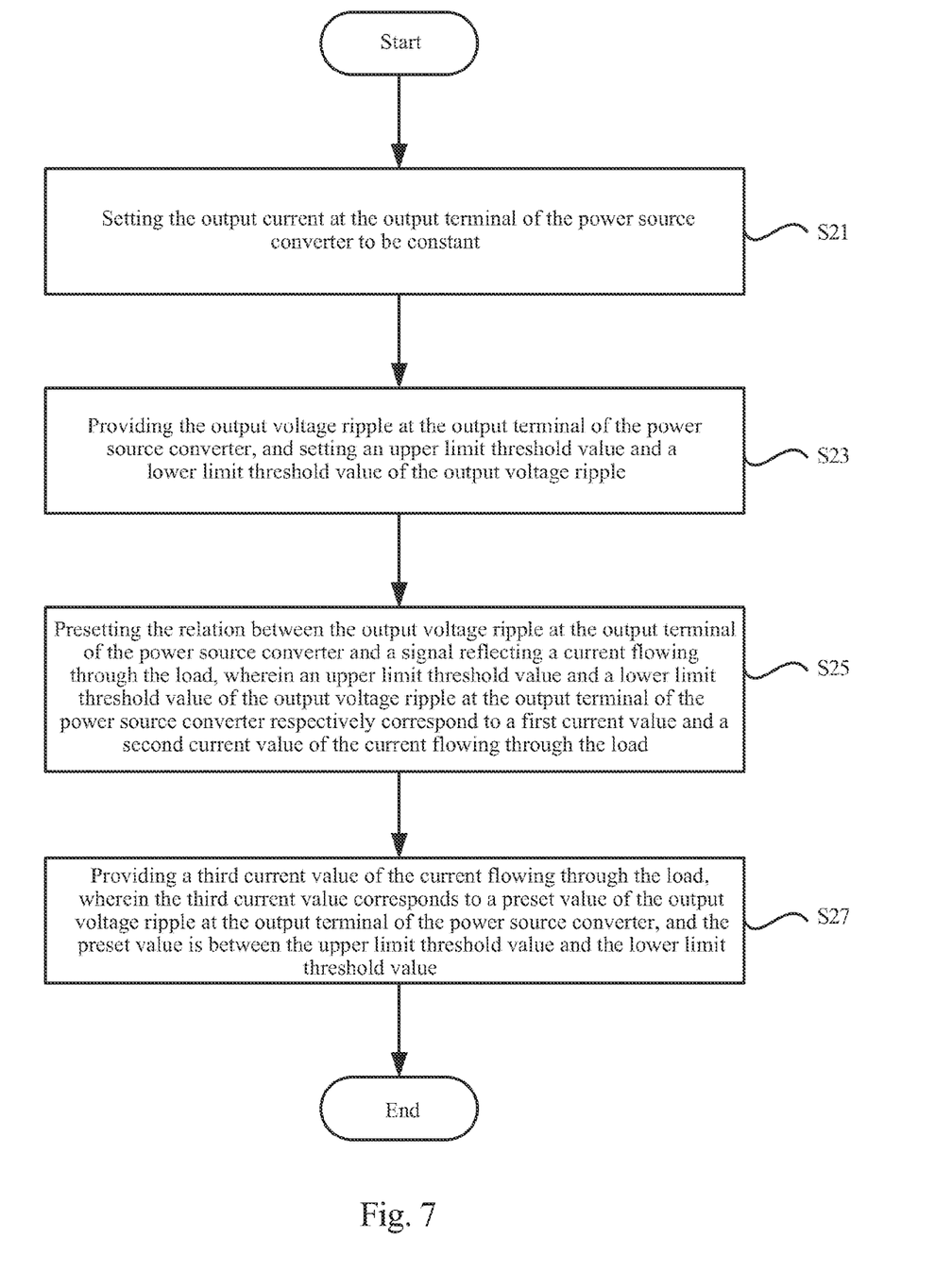
FIG. 7 illustrates a flow block diagram of the control method in second embodiment of the present disclosure.

FIG. 7 illustrates a flow chart of the control method of a second embodiment of the present disclosure. Referring to FIG. 7, in the control method, firstly in step S21, the output current at the output terminal of the power source converter is set to be constant; next in step S23, the output voltage ripple at the output terminal of the power source converter is provided, and an upper limit threshold value and a lower limit threshold value of the output voltage ripple are set; and subsequently in step S25, the relation between the output voltage ripple at the output terminal of the power source converter and a signal reflecting a load current is preset, and the output voltage ripples at the output terminal of the power source converter respectively correspond to a first current value and a second current value of the load current; finally in step S27, a third current value of the load current is provided, which corresponds to a preset value of the output voltage ripple at the output terminal of the power source converter, and the preset value ranges between the upper limit threshold value and the lower limit threshold value. In an embodiment, the second current value is greater than the first current value, and the third current value is greater than the second current value.

More specifically, with steps S21 and S23, when the output current at the output terminal of the power source converter is constant (that is, the peak value $I_{pk}$ of the output current is constant), according to the corresponding relation between the output voltage ripple ($V_{out\_max} - V_{out\_min}$) at the output terminal of the power source converter and the load current $I_{out}$, a corresponding output voltage ripple can be obtained based on the actual load current, so as to control the output voltage ripple to reduce the audio noise of the power source converter.

In comparison of FIG. 7 and FIG. 6, a control object in the control method of FIG. 7 is the output voltage ripple at the output terminal of the power source converter, while a control object in FIG. 6 is the output current at the output terminal of the power source converter. According to the above formula (6), along with the change of the output voltage ripple or the output current, the burst frequency is changed correspondingly, and thus the purpose of reducing the audio noise is achieved.

Figure 8:
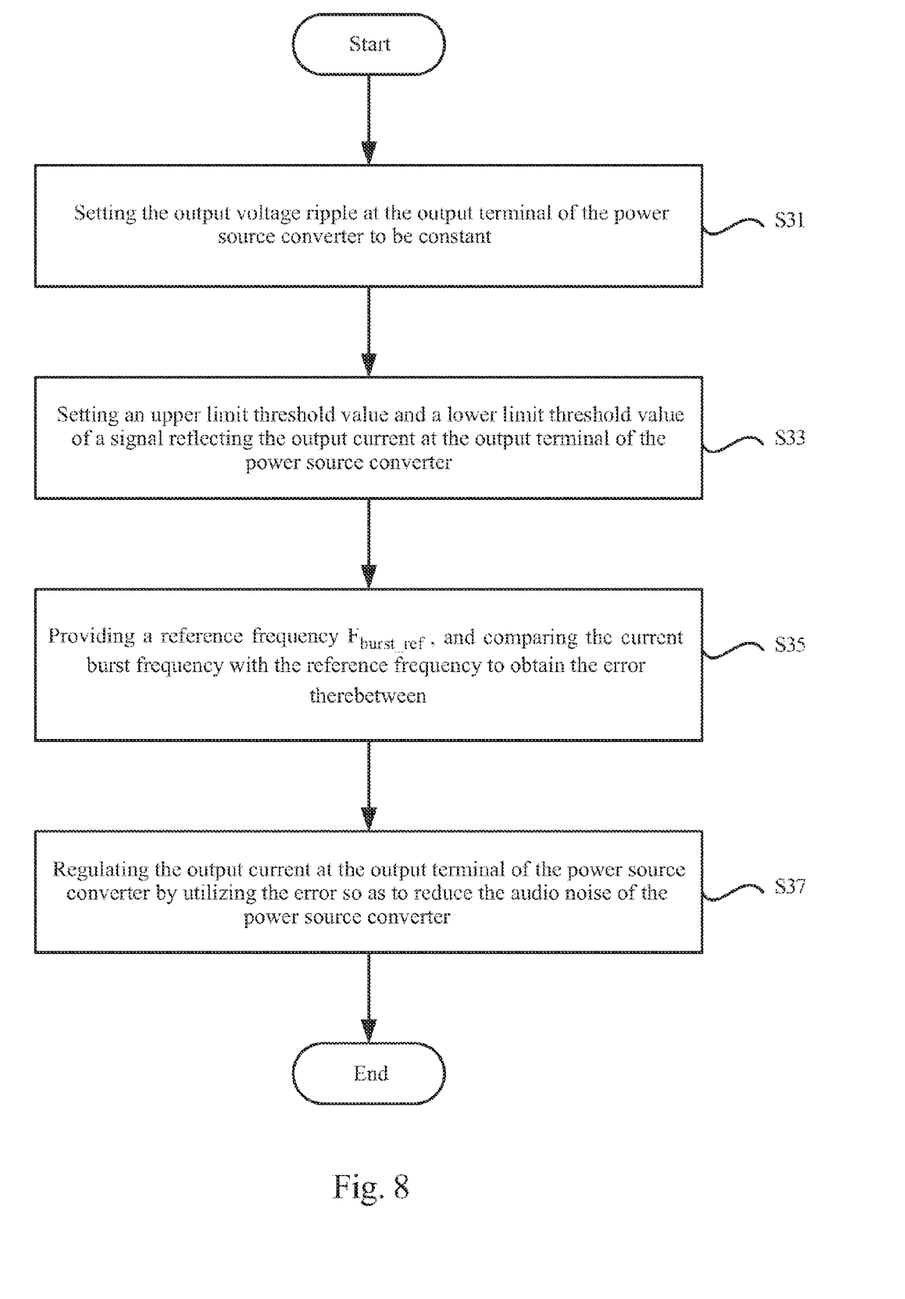
FIG. 8 illustrates a flow block diagram of the control method in third embodiment of the present disclosure.

FIG. 8 illustrates a flow chart of the control method of a third embodiment of the present disclosure. Referring to FIG. 8, in the control method, firstly in step S31, the output voltage ripple at the output terminal of the power source converter is set to be constant; next in step S33, an upper limit threshold value and a lower limit threshold value of a signal reflecting the output current at the output terminal of the power source converter are set; and subsequently in step S35, a reference frequency $F_{burst\_ref}$ is provided, and the actual burst frequency of the power source converter is compared with the reference frequency to obtain the error therebetween; and finally in step S37, the output current at the output terminal of the power source converter is regulated by utilizing the error so as to reduce the audio noise of the power source converter.

In an embodiment, if the actual burst frequency is greater than or equal to the reference frequency, the control method includes the step of decreasing the output current at the output terminal of the power source converter. Furthermore, the control method includes the step of decreasing the output current at the output terminal of the power source converter to the lower limit threshold value, and the burst frequency corresponding to the lower limit threshold value is far smaller than the mechanical resonant frequency of a related component in the power source converter, so as to reduce the audio noise. More specifically, according to the above formula (6), when the output current (corresponding to the peak value $I_{pk}$ of the output current and the average $I_{D\_avg}$ of the peak value in the single pulse period) at the output terminal of the power source converter increases gradually, the burst frequency also increases gradually; and when the output current at the output terminal of the power source converter is reduced gradually, the burst frequency also decreases gradually. Therefore, when the actual burst frequency is greater than or equal to the reference frequency, it can be reduced by decreasing the output current at the output terminal of the power source converter.

In an embodiment, if the actual burst frequency is smaller than the reference frequency, the control method includes the step of increasing the output current at the output terminal of the power source converter. Furthermore, the control method includes the step of increasing the output current at the output terminal of the power source converter to the upper limit threshold value, and the burst frequency corresponding to the upper limit threshold value also can make the audio noise of the power source converter reduce. Furthermore, increasing the output current at the output terminal of the power source converter can improve or optimize the energy transfer efficiency of the energy transferred from the first input terminal IN1 and the second input terminal IN2 to the first output terminal OUT1 and the second output terminal OUT2 of the power source converter 10 as shown in FIG. 1.

In comparison of FIGS. 8 and 6, both the control methods of FIGS. 8 and 6 are directed to control the output current at the output terminal of the power source converter. However, in the embodiment shown in FIG. 6, the peak value of the output current is obtained based on an real-time load current, according to the corresponding relation between the peak value of an output current at the output terminal of the power source converter and a load current, so as to control the output current at the output terminal of the power source converter. Compared with FIG. 6, in the embodiment of FIG. 8, an actual burst frequency of the power source converter is compared with a reference frequency, and the output current at the output terminal of the power source converter is regulated according to a frequency error therebetween. Therefore, the realization process of the control method is different fundamentally.

Figure 9:
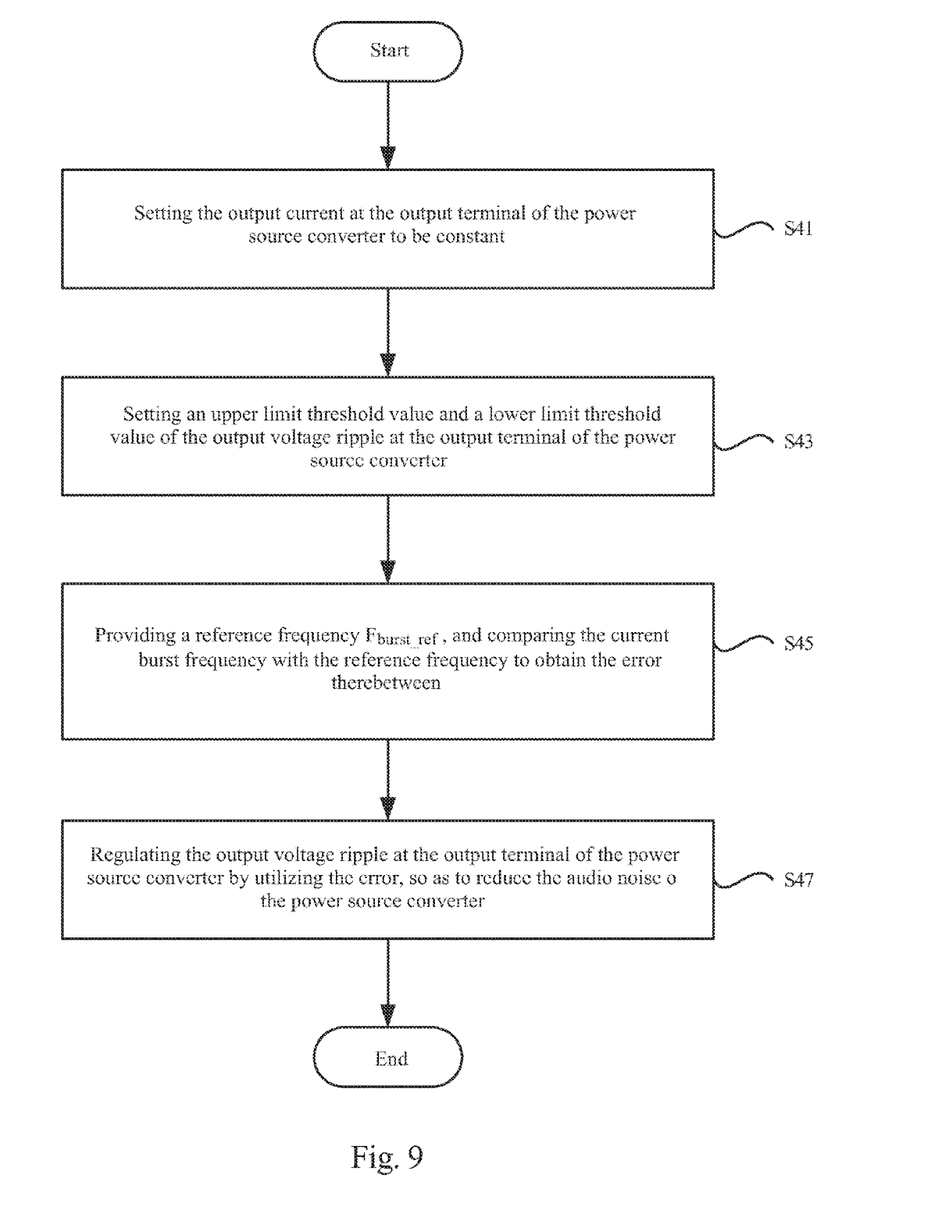
FIG. 9 illustrates a flow block diagram of the control method in fourth embodiment of the present disclosure.

FIG. 9 illustrates a flow chart of the control method of a fourth embodiment of the present disclosure. Referring to FIG. 9, in the control method, firstly in step S41, the output current at the output terminal of the power source converter is set to be constant; next in step S43, an upper limit threshold value and a lower limit threshold value of the output voltage ripple at the output terminal of the power source converter are set; and subsequently in step S45, a reference frequency $F_{burst\_ref}$ is provided, and the actual burst frequency of the power source converter is compared with the reference frequency, so as to obtain an error therebetween; and finally in step S47, the output voltage ripple is regulated by utilizing the error, so as to reduce the audio noise of the power source converter.

In an embodiment, if the actual burst frequency is greater than or equal to the reference frequency, the control method includes the step of increasing the output voltage ripple ($V_{out\_max}-V_{out\_min}$) at the output terminal of the power source converter. Moreover, the control method includes the step of increasing the output voltage ripple to the upper limit threshold value, and the burst frequency corresponding to the upper limit threshold value is far smaller than the mechanical resonant frequency of a related component in the power source converter, so as to reduce the audio noise. More specifically, according to the formula (6), when the output voltage ripple increases gradually, the burst frequency is reduced gradually; and when the output voltage ripple decreases gradually, the burst frequency increases gradually. Therefore, when an actual burst frequency is greater than or equal to a reference frequency, it can be reduced by increasing the output voltage ripple at the output terminal of the power source converter.

In another embodiment, if the actual burst frequency is smaller than the reference frequency, the control method includes the step of reducing the output voltage ripple at the output terminal of the power source converter. Moreover, the control method includes the step of reducing the output voltage ripple at the output terminal of the power source converter to the lower limit threshold value, and the burst frequency corresponding to the lower limit threshold value also can make the audio noise of the power source converter reduce.

By adopting the control method of the present disclosure for reducing the audio noise, when the power source converter operates in a burst mode, the burst period of the power source converter is changed by regulating the electrical energy transferred from the input side to the output side in the operating period of the burst cycle, so as to regulate the burst frequency, and thus the burst frequency is kept away from the mechanical resonant frequency of a magnetic component, so as to reduce the audio noise. Moreover, under the condition that the audio noise of the power source converter meets the expected requirements, the peak value of the output current at the output terminal of the power source converter can be regulated, so as to optimize the energy transfer efficiency of the electrical energy transferred from the first and second input terminals to the first and second output terminals of the power source converter.

Although the present disclosure has been disclosed with reference to the above embodiments, these embodiments are not intended to limit the present disclosure. It will be apparent to those skilled in the art that various modifications and variations can be made without departing from the scope or spirit of the present disclosure. Therefore, the scope of the present disclosure shall be defined by the appended claims.

What is claimed is:

1. A control method for reducing the audio noise, comprising:
providing an input power source having a first terminal and a second terminal;
providing a power source converter, wherein the power source converter comprises:
a first input terminal and a second input terminal, wherein the first input terminal of the power source converter is connected to the first terminal of the input power source, and the second input terminal of the power source converter is connected to the second terminal of the input power source;

a first output terminal and a second output terminal;

an output capacitor having a first terminal and a second terminal, wherein the first terminal of the output capacitor is connected to the first output terminal of the power source converter, and the second terminal of the output capacitor is connected to the second output terminal of the power source converter; and a component having a mechanical resonant frequency, coupled to one of the first input terminal, the second input terminal, the first output terminal and the second output terminal of the power source converter;

providing a load having a first terminal and a second terminal, wherein the first terminal of the load is connected to the first terminal of the output capacitor, and the second terminal of the load is connected to the second terminal of the output capacitor;

making the power source converter operate in a burst mode, wherein the burst mode has a burst cycle, and the burst cycle comprises an operating period $T_{burst\_on}$ and an idle period $T_{burst\_off}$, and the operating period $T_{burst\_on}$ at least includes a single pulse period $T_s$; and controlling the electrical energy transferred from the first input terminal and the second input terminal to the first output terminal and the second output terminal of the power source converter during the operating period $T_{burst\_on}$, so as to reduce the audio noise of the power source converter.

2. The control method of claim 1, wherein the step of controlling the electrical energy transferred from the first input terminal and the second input terminal to the first output terminal and the second output terminal of the power source converter further comprises:

controlling electrical energy transferred from the first input terminal and the second input terminal to the first output terminal and the second output terminal of the power source converter during the single pulse period $T_s$ of the operating period $T_{burst\_on}$.

3. The control method of claim 2, wherein the step of controlling the electrical energy transferred from the first input terminal and the second input terminal to the first output terminal and the second output terminal of the power source converter further comprises:

detecting the output power of the power source converter; and regulating electrical energy transferred from the first input terminal and the second input terminal to the first output terminal and the second output terminal of the power source converter during the single pulse period $T_s$ according to the detected output power.

4. The control method of claim 3, wherein the step of detecting the output power further comprises:

detecting a signal reflecting a current flowing through the load.

5. The control method of claim 3, wherein the step of controlling the electrical energy transferred from the first input terminal and the second input terminal to the first output terminal and the second output terminal of the power source converter further comprises:

regulating an output current at the output terminal of the power source converter, so as to regulate electrical energy transferred from the first input terminal and the second input terminal to the first output terminal and the second output terminal of the power source converter during the single pulse period $T_s$.

6. The control method of claim 4, wherein the step of controlling the electrical energy transferred from the first input terminal and the second input terminal to the first output terminal and the second output terminal of the power source converter further comprises:

setting an output voltage ripple at the output terminal of the power source converter to be constant; and providing a signal reflecting the output current at the output terminal of the power source converter, and setting the upper limit threshold value and the lower limit threshold value of the signal.

7. The control method of claim 6, wherein the step of controlling the electrical energy transferred from the first input terminal and the second input terminal to the first output terminal and the second output terminal of the power source converter further comprises:

presetting a relation between the signal reflecting the output current at the output terminal of the power source converter and a signal reflecting a current flowing through the load, wherein the upper limit threshold value of the signal reflecting the output current at the output terminal of the power source converter corresponds to a first current value of the current flowing through the load, and the lower limit threshold value of the signal reflecting the output current at the output terminal of the power source converter corresponds to a second current value of the current flowing through the load; and providing a third current value of the current flowing through the load, wherein the third current value corresponds to a preset value of the signal reflecting the output current at the output terminal of the power source converter, and the preset value ranges between the upper limit threshold value and the lower limit threshold value of the signal reflecting the output current at the output terminal of the power source converter.

8. The control method of claim 7, wherein the second current value is greater than the first current value and the third current value is greater than the second current value.

9. The control method of claim 7, wherein the step of controlling the electrical energy transferred from the first input terminal and the second input terminal to the first output terminal and the second output terminal of the power source converter further comprises:

controlling the output current at the output terminal of the power source converter according to the relation between a signal reflecting the output current at the output terminal of the power source converter and the signal reflecting a current flowing through the load, so as to reduce the audio noise of the power source converter.

10. The control method of claim 1, wherein the step of controlling the electrical energy transferred from the first input terminal and the second input terminal to the first output terminal and the second output terminal of the power source converter further comprises:

setting an output current at the output terminal of the power source converter to be constant; and providing an output voltage ripple at the output terminal of the power source converter, and setting an upper limit threshold value and a lower limit threshold value of the output voltage ripple.

11. The control method of claim 10, wherein the step of controlling the electrical energy transferred from the first input terminal and the second input terminal to the first output terminal and the second output terminal of the power source converter further comprises:

presetting the relation between the output voltage ripple at the output terminal of the power source converter and a signal reflecting a current flowing through the load, wherein the lower limit threshold value of the output voltage ripple corresponds to a first current value of the current flowing through the load, and the upper limit threshold value of the output voltage ripple corresponds to a second current value of the current flowing through the load; and providing a third current value of the current flowing through the load, wherein the third current value corresponds to a preset value of the output voltage ripple, and the preset value ranges between the upper limit threshold value and the lower limit threshold value of the output voltage ripple.

12. The control method of claim 11, wherein the second current value is greater than the first current value and the third current value is greater than the second current value.

13. The control method of claim 11, wherein the step of controlling the electrical energy transferred from the first input terminal and the second input terminal to the first output terminal and the second output terminal of the power source converter further comprises:

controlling the output voltage ripple according to the relation between the output voltage ripple and the signal reflecting a current flowing through the load, so as to reduce the audio noise of the power source converter.

14. The control method of claim 1, wherein the step of controlling the electrical energy transferred from the first input terminal and the second input terminal to the first output terminal and the second output terminal of the power source converter further comprises:

setting an output voltage ripple at the output terminal of the power source converter to be constant;

setting an upper limit threshold value and a lower limit threshold value of a signal reflecting the output current at the output terminal of the power source converter;

providing a reference frequency, and comparing the actual burst frequency with the reference frequency, so as to obtain an error therebetween; and regulating the output current at the output terminal of the power source converter according to the error, so as to reduce the audio noise of the power source converter.

15. The control method of claim 14, wherein the output current at the output terminal of the power source converter is decreased when the current burst frequency is greater than or equal to the reference frequency.

16. The control method of claim 15, wherein the output current at the output terminal of the power source converter is decreased to the lower limit threshold value of the output current.

17. The control method of claim 14, wherein the output current at the output terminal of the power source converter is increased when the current burst frequency is smaller than the reference frequency.

18. The control method of claim 17, wherein the output current at the output terminal of the power source converter is increased to the upper limit threshold value of the output current.

19. The control method of claim 1, wherein the step of controlling the electrical energy transferred from the first input terminal and the second input terminal to the first output terminal and the second output terminal of the power source converter further comprises:

setting an output current at the output terminal of the power source converter to be constant;

setting an upper limit threshold value and a lower limit threshold value of the output voltage ripple at the output terminal of the power source converter;

providing a reference frequency, and comparing the actual burst frequency with the reference frequency, so as to obtain an error therebetween; and regulating the output voltage ripple at the output terminal of the power source converter according to the error, so as to reduce the audio noise of the power source converter.

20. The control method of claim 19, wherein the output voltage ripple at the output terminal of the power source converter is increased when the actual burst frequency is greater than or equal to the reference frequency.

21. The control method of claim 20, wherein the output voltage ripple at the output terminal of the power source converter is increased to the upper limit threshold value of the output voltage ripple.

22. The control method of claim 19, wherein the output voltage ripple at the output terminal of the power source converter is decreased when the actual burst frequency is smaller than the reference frequency.

23. The control method of claim 22, wherein the output voltage ripple at the output terminal of the power source converter is decreased to the lower limit threshold value of the output voltage ripple.

* * * * *